A. G. STOHN AND T. HOWARD.
CIRCUIT CLOSER FOR VEHICLE SIGNALS.
APPLICATION FILED APR. 10, 1918.
1,331,684.
Patented Feb. 24, 1920.
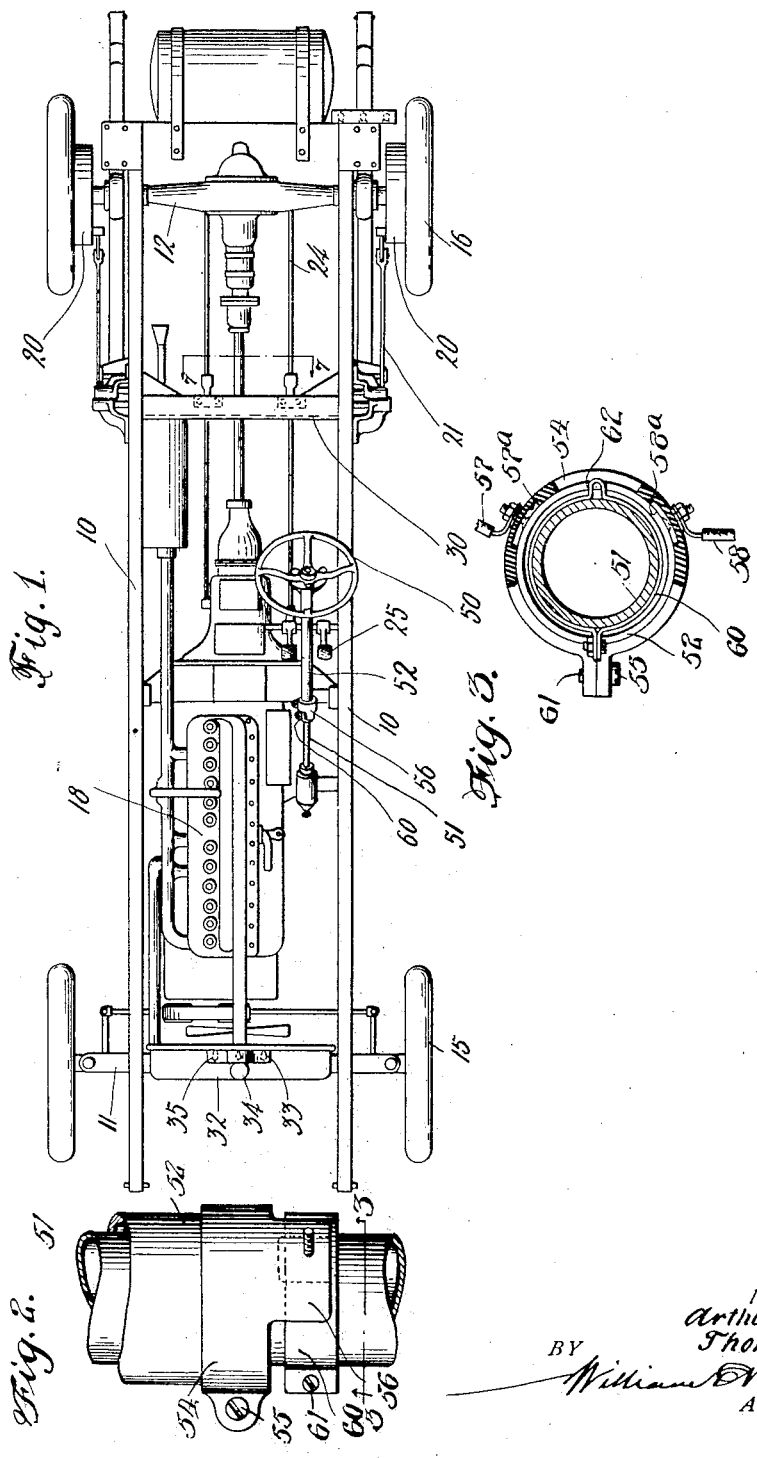
INVENTORS
Arthur G. Stohn.
Thomas Howard.
BY William E. Richards
ATTORNEY

UNITED STATES PATENT OFFICE.

ARTHUR G. STOHN, OF JERSEY CITY, NEW JERSEY, AND THOMAS HOWARD, OF NEW YORK, N. Y.

CIRCUIT-CLOSER FOR VEHICLE-SIGNALS.

1,331,684. Specification of Letters Patent. Patented Feb. 24, 1920.

Application filed April 10, 1918. Serial No. 227,640.

*To all whom it may concern:*

Be it known that we, ARTHUR G. STOHN, a citizen of the United States, residing at Jersey City, county of Hudson, State of New Jersey, and THOMAS HOWARD, a citizen of the United States, residing at New York, in the county and State of New York, have invented certain new and useful Improvements in Circuit-Closers for Vehicle-Signals, of which the following is a specification.

This invention relates to improvements in vehicle signals in which the turning direction or stopping intention is visibly indicated.

One of the principal objects of the invention is to provide signals by means of electric lights arranged at the front and rear of the vehicle, and upon each side thereof, with means whereby they are caused to glow, by contacts carried by the steering post and operated by its movement automatically, and thereby indicate the direction in which the vehicle is being turned.

A further object is to provide such devices in forms so designed that they can readily be applied to any ordinary type of power propelled wheeled vehicle, at any time, as during its construction or supplied later, its installation entailing but few changes and the use of a limited number of additional parts, and but little expense.

These and other like objects are attained by the novel construction and combinations hereinafter described and shown in the accompanying drawings, forming a material part of this disclosure, and in which:—

Figure 1 is a partial top plan view of a conventional type of automobile chassis, including the engine, running gear, steering and braking mechanism, and indicating the application of the invention thereto;

Fig. 2 is a fragmental side elevational view of the steering post of an automobile;

Fig. 3 is a transverse sectional view taken on line 3—3 of Fig. 2.

We have here shown our invention applied to an automobile whose chassis frame shown is comprised of a pair of spaced side bars 10, supported by springs resting upon the axles 11 and 12 respectively, at the front and rear, with which are engaged the wheels 15 and 16; an engine 18 is carried between the bars 10, which are connected in the usual manner by cross braces. Arranged upon the rear axle 12 are brakes 20. Contiguous to the rear wheels, the same being operated by rods 21, connected by levers with other parallel rods 24 operated by the foot brake pedal 25 in the usual manner.

At the front of the car is a radiator 32, on the top of which are mounted three lights respectively 33, 34, and 35, the center light 34 forming a stop signal constituting no part of the invention here claimed. The steering hand-wheel 50 is rigidly mounted on the upper end of a steering post 51, the lower end of which passes through a sleeve or column 52 and has clamped upon it a collar 54, adjustable by the screw 55, and having a down-turned extension 56 to which is secured at spaced points in an insulated manner, wires respectively 57 and 58, each leading through battery to one terminal of the lamps 33 and 35, the other lamp terminals being grounded to the frame. Also clamped upon the steering post 51, is a split ring 60, held by the clamp screw 61 opposite to which is a raised loop 62, held in such manner that as the steering post is turned to the one side or the other so as to bring the loop 62 which is grounded to the frame into contact with either of the terminal contact plates 57ª or 58ª respectively of the wires 57 or 58, the lamp 35, or the lamp 33, will be caused to be lighted.

In operation the parts having been assembled as herein indicated, upon turning the steering wheel 50, so as to move the front wheels angularly with respect to the frame, as for instance to direct the car to the right, the loop 62 makes contact with the terminal of the contact 57ª of the wire 57, causing the lamp 35 to glow, so long as contact is maintained. Obviously if the vehicle be steered to the left the loop 62 will make contact with the contact 58ª of the wire 58, causing the lamp 33 to glow, and indicating to persons in the front or rear of the vehicle the direction in which the vehicle will proceed.

Although we have described our automatic device as attached to specified parts of the car, it will be obvious that many changes in arrangement may be made without departing from the spirit of our invention.

Having now described our invention, what we claim as new and desire to secure by Letters Patent is:—

1. In a circuit closer for vehicle signals, in combination with the steering post and steering column of the vehicle, a sleeve clamped upon the lower end of the steering column and having a pair of insulated arcuate contact members on its inner face flush therewith, said arcuate contact members being located below the end of the steering column, and a contact member clamped upon the steering post and normally projecting between said arcuate members.

2. In a circuit closer for vehicle signals, in combination with the steering post and steering column of the vehicle, a sleeve clamped upon the lower end of the steering column and having a pair of insulated arcuate contact members on its inner face, and a contact member clamped upon the steering post and normally projecting between said arcuate contact members, said last mentioned contact member consisting of a split ring clamped upon the steering post and having a raised loop diametrically opposite the split ends adapted to engage the arcuate contact members.

3. In a circuit closer for vehicle signals, in combination with the steering post and streeing column of the vehicle, a sleeve clamped upon the lower end of the steering column and having segmental downward extensions, a pair of arcuate contact members mounted on the inner faces of the said extensions and flush therewith, and a contact member carried by the steering post and projecting between said extensions, said last mentioned contact member consisting of a split ring clamped upon the steering post and having a raised loop diametrically opposite the split end adapted to engage the said arcuate contact members.

In testimony whereof we have signed our names to this specification in the presence of two subscribing witnesses, this 17th day of December, 1917.

ARTHUR G. STOHN.
THOMAS HOWARD.

Witnesses:
WILLIAM E. RICHARDS,
GEO. N. VERITZAN.